US005160949A

United States Patent [19]

Marglin

[11] Patent Number: 5,160,949

[45] Date of Patent: Nov. 3, 1992

[54] DIGITAL CUE SYSTEM FOR A MOTION PICTURE PROJECTION SYSTEM

[76] Inventor: Andrew J. Marglin, 39 Lloyd La., Lloyd Neck, N.Y. 11743

[21] Appl. No.: 705,506

[22] Filed: May 24, 1991

Related U.S. Application Data

[63] Continuation-in-part of Ser. No. 462,610, Jan. 9, 1990.

[51] Int. Cl.[5] .......... G03B 21/50

[52] U.S. Cl. .......... 352/92; 352/236

[58] Field of Search .......... 352/92, 236

[56] References Cited

U.S. PATENT DOCUMENTS

| | | | |
|---|---|---|---|
| 1,944,024 | 1/1934 | Foster et al. | 352/92 |
| 4,385,814 | 5/1983 | Elliott | 352/92 |
| 4,673,266 | 6/1987 | Fiumi | 352/92 |
| 4,938,585 | 7/1990 | Wieffenbach et al. | 352/92 |

*Primary Examiner*—Monroe H. Hayes
*Attorney, Agent, or Firm*—Amster, Rothstein & Ebenstein

[57] ABSTRACT

A digital cue system for use with a motion picture projector permits activation of control functions in time synchronization with the passage through the projector of indicia or cues attached to the motion picture film. Each cue comprises one or more cue appliques arranged to form a digital code pattern which is detected to activate a control function associated therewith. In an exemplary embodiment, the cue appliques are metallic foils adhesively attached to the motion picture film. Passage of these appliques through the motion picture projector is detected by one or more non-contacting proximity detectors which generate signals indicative of the digital code patterns. Digital circuitry processes the signals output from the proximity detectors to determine the digital code corresponding to each pattern and a specific control function associated with that digital code is then activated. By utilizing and detecting digital code patterns, cueing of a large number of control functions with a small number of cue appliques is made possible.

17 Claims, 5 Drawing Sheets

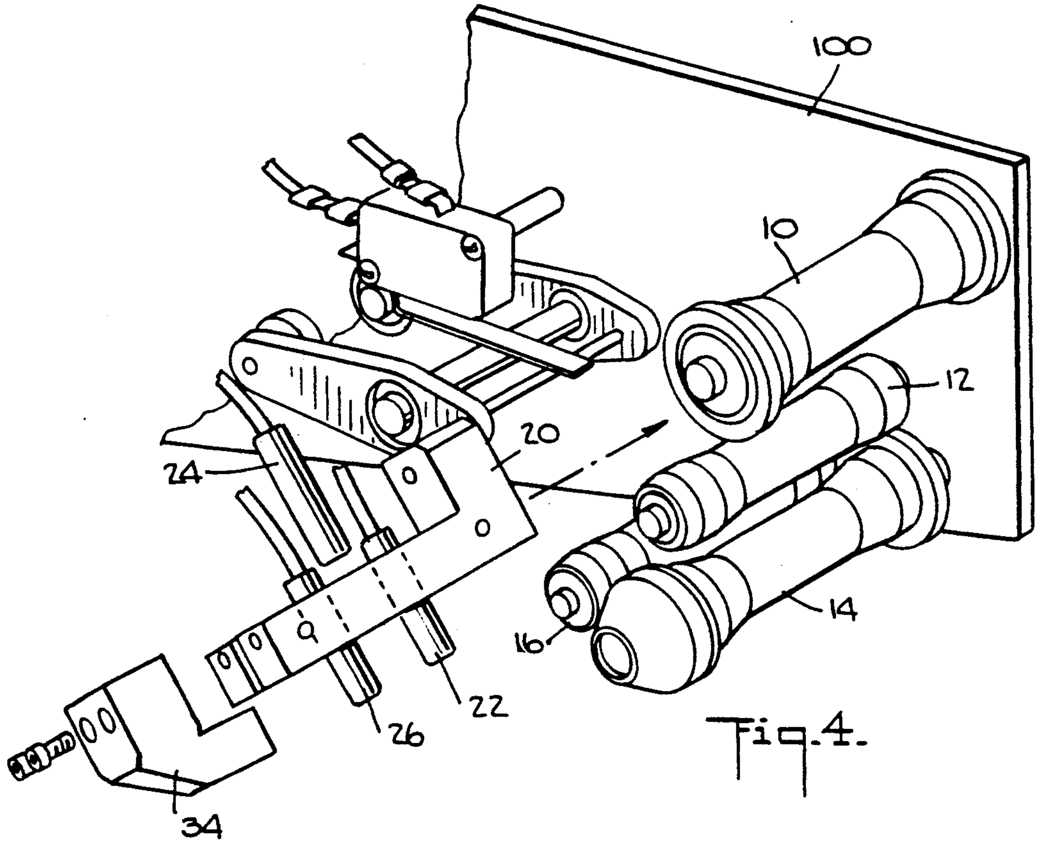
Fig. 4.
Fig. 5.
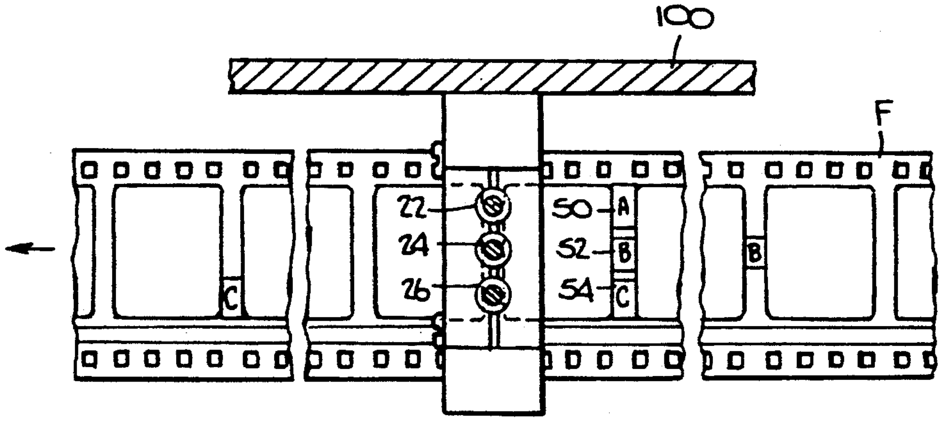

DIGITAL CUE SYSTEM FOR A MOTION PICTURE PROJECTION SYSTEM

This application is a continuation-in-part of copending application Ser. No. 07/462,610, filed Jan. 9, 1990, the disclosure of which is incorporated herein by reference.

The present invention is directed to a cue system which operates in conjunction with motion picture film projectors of the type used in commercial movie theaters. The purpose of the cue system is to activate various control functions for initiating events in the theater or effecting changes in the projector in time synchronization with the detection of cues placed at predetermined locations on the motion picture film. In particular, the present invention provides an improved cue system which makes use of digital technology to provide novel cue and detector arrangements for cueing and activating a large number of such control functions in a simple, yet easy to use and highly reliable system.

BACKGROUND OF THE INVENTION

In a movie theater, the cueing and activation of many functions which relate to the overall movie presentation are synchronized with the passage through the projector of indicia or cues attached to certain points on the motion picture film. The functions to be controlled may involve changes within the theater or may provide control adjustments within the motion picture projector. As an example of events within the theater, the detection of these indicia or cues is generally used to control the level of theater lighting, the opening of the curtain at the beginning of the movie presentation, etc. In addition, cues are used to automatically select various sound systems, as for example use of normal sound or enhanced sound (e.g. Dolby sound) systems, the control of "change over" devices which switch from one projector to another, and the control of lens assemblies on the projector (e.g. automatic switching between a normal "flat" lens and a cinemascope lens). Modern automated theater facilities increasingly rely on such cues to change projector lenses and apertures, control screen format size and select sound formats, in order to provide a fully automated projection system in which the expense of projector operators or other manual intervention is eliminated.

To provide cueing capability, the prior art has used various indicia or cues placed at selected locations along the motion picture film strip and has devised various schemes for detecting these cues to automatically activate the desired events. Many different types of cues and cue detection systems have been developed and used over the years. As one example of an early cue system, notches permanently cut into the edge borders of the motion picture film were detected by various mechanical arrangements. However, the notches tended to weaken the film and caused it to rapidly wear with use. The detection of magnetic strips and/or paint applied along the motion picture film has also been used as the basis for prior art cue systems, but these systems have not found widespread acceptance.

The prior art has also utilized bar coded labels attached at predetermined positions of the motion picture film strip to activate a particular cueing function. However, the labels are opaque and of a size which interferes with at least one picture frame. In my copending parent application Ser. No. 07/462,610, this problem has been solved by providing a visibly transparent bar code label, wherein the bar code symbols are printed with a special infra red ink that is not visible under ordinary light, but readable with an infra red sensitive bar code scanner. However, notwithstanding this improvement, the use of bar code labels and associated scanners in a cue detection system suffers from being overly complicated and extremely expensive for the intended usage, often resulting in expensive repairs. Therefore, this approach has not found widespread commercial acceptance.

The most widely used cue system in today's theaters operates by detecting the presence of electrically conductive cue strips adhesively attached to the edge borders of the film. The most commonly used conductive cue strip is a length of aluminum foil backed with adhesive. The presence of the aluminum foil is detected when the conductive cue strip enters a cue detector mounted on the projector and spans the space between two spaced-apart rollers in the cue detector to complete an electrical circuit.

This type of prior art cue detector is described in my Application Ser. No. 241,582, now abandoned. As shown therein, the prior art cue system operates by providing a pair of contacts which are momentarily bridged by the passage of the conductive cue strip. The contacts are metallic rollers which are spaced apart on insulated shafts, and arranged so that the rollers contact the edge borders of the film to which the electrically conductive cue strip has been attached. When the cue strip bridges the gap between the rollers, an electrical circuit is completed which activates a predetermined control function.

The cue detector is mounted on the projector housing so that the film is intercepted prior to the take up reel or platter. To ensure good electrical contact and positive cue detection, this prior art cue detector must be precisely aligned to the film path, and a relatively constant force must be maintained between the film and the rollers.

A second type of prior art cue detector system utilizes a sequential advance programmer activated by detection of cues placed on predetermined portions of the film. A single proximity detector mounted along the film path detects the proximate passage of a cue. The system is sequentially advanced with each detection to activate a preprogrammed sequence of control functions.

A problem inherent in the design of prior art cue detector systems is their inability to accommodate the growing demand by movie theater operators for control of an ever increasing number of functions. It is apparent that the number of unique ways in which prior art cues may be positioned is rather limited. Although conductive cue strips of different lengths may be used to identify different control functions, the detection of different length cues requires the provision of precise timing circuits in the cue detector system, and leads to undesirable complexity and expense.

SUMMARY OF THE INVENTION

It is an object of the present invention to overcome the deficiencies of prior art cue systems by providing an improved cue detection system based upon digital design principles whose functionality can be readily expanded to control a large number of control functions in a simple manner.

It is a further object of this invention to provide a cue detection system in which consistent multifunctional cue detection may be accomplished without the need for contact between the cue strip and the cue detector.

It is still another object of this invention to provide the above mentioned advantages in a design which can be easily and economically retrofitted to upgrade prior art cue detector systems commonly in use in many movie theaters.

These and other objects of the invention are met by the disclosed cue system which comprises indicia provided at one or more predetermined positions along the motion picture film. At each such position, the indicia are formed by one or more cue appliques positioned to define a pattern representative of one of a plurality of digital codes, each of which corresponds to one of the control functions to be activated by the cue system. The cue system includes means for detecting the passage of the indicia during transport of the motion picture film through the projector and for generating signals indicative of the pattern, and circuit means for processing these signals to determine the digital code and activate the corresponding control function.

BRIEF DESCRIPTION OF THE DRAWINGS

For a fuller understanding of the nature, features and advantages of the present invention, reference should be made to the following detailed description of a preferred embodiment of the invention, as illustrated by the accompanying drawings wherein:

FIG. 4 shows an exploded view of the cue detector assembly and illustrates how the proximity detectors are mounted into position along a support assembly. A film guide member is attached to one end of the support assembly.

FIG. 5 shows a top view looking downward along the axes of the proximity detectors. For illustrative purposes, three proximity detectors are shown mounted into position. For purposes of illustration, the film strip shown in FIG. 5 has cue appliques arranged in various configurations adhesively attached along the interframe borders of the film strip. Each configuration represents a unique digital code.

DESCRIPTION OF THE PREFERRED EMBODIMENT

Figure 1:
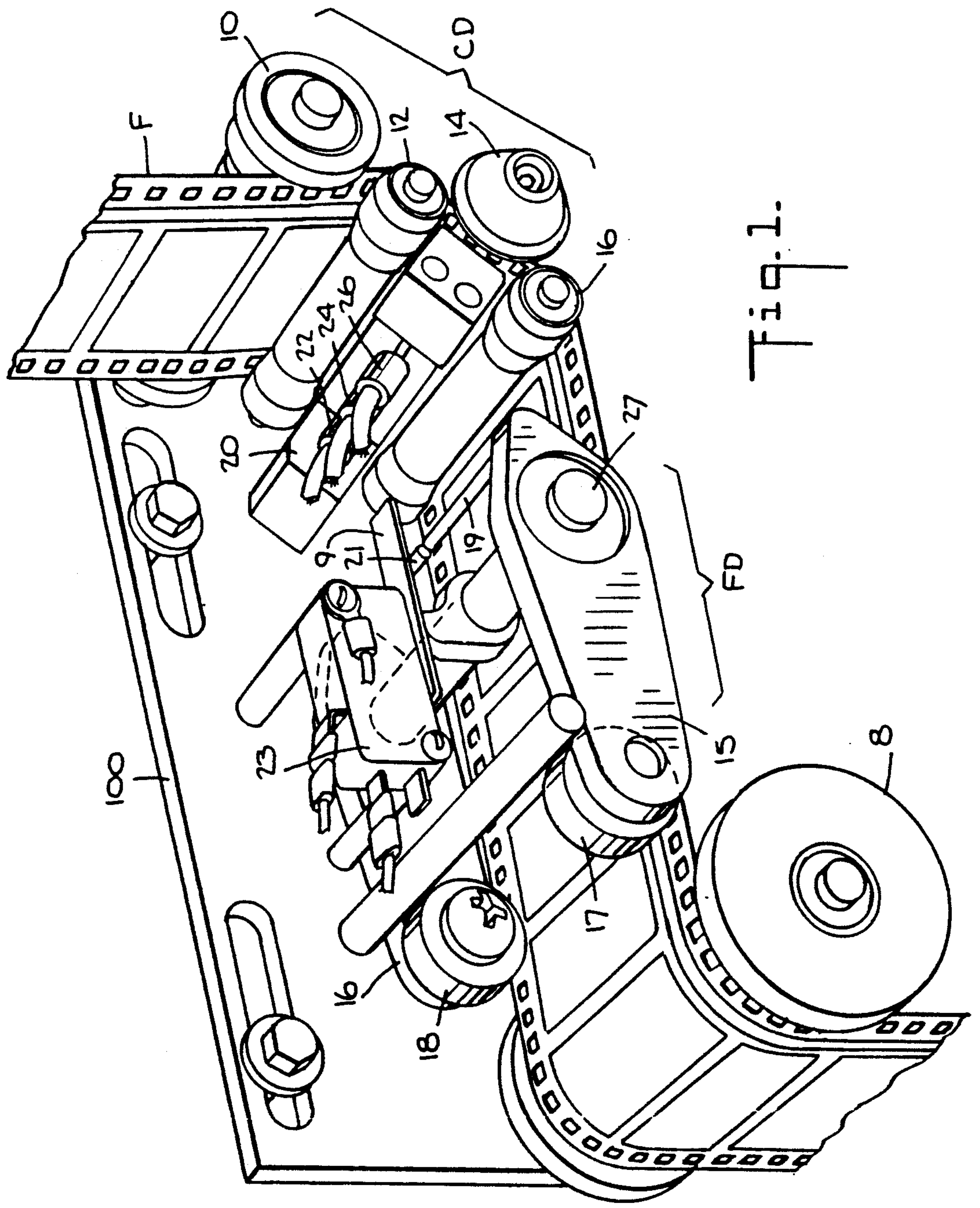
FIG. 1 is a perspective view of the components of the cue detection system which are mounted onto the projector housing. The components include a cue detector assembly shown in its operative position, wherein a film strip enters from the top of the drawing, moves past a row of proximity detectors, traverses a substantially horizontal path underneath a failsafe device which can detect a break in the film, and exits in a downwardly direction after passing around an exit roller.
Figure 2:
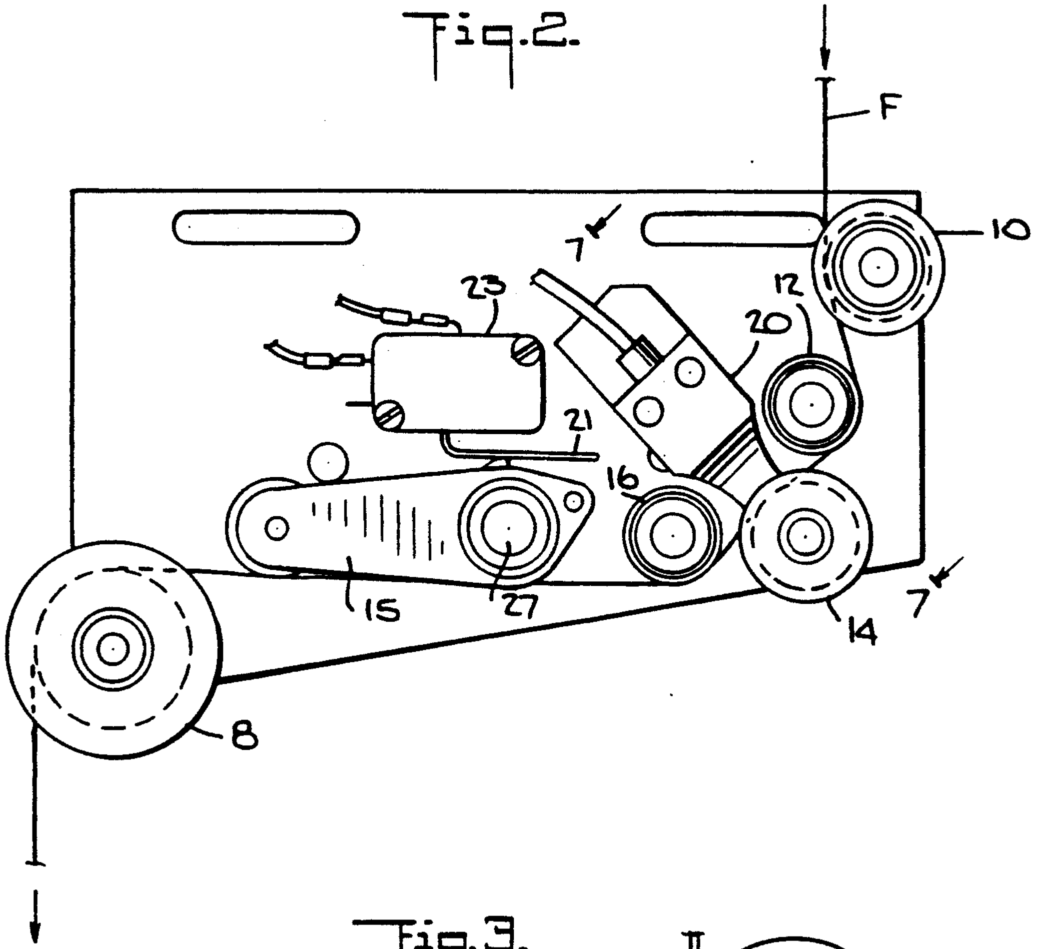
FIG. 2 is a front view of the cue detector assembly showing the relationship between the film path, as defined by the rollers of the cue detector assembly, the row of proximity detectors, and the failsafe device. The operative film path is show. As illustrated, the film strip entering the assembly on the right hand side of the drawing is aligned by a top guide roller and then positioned with respect to the row of proximity detectors by three positioning rollers. The film strip then passes under the failsafe device and over an exit roller at the lowermost left-hand corner of the FIGURE.
Figure 3:
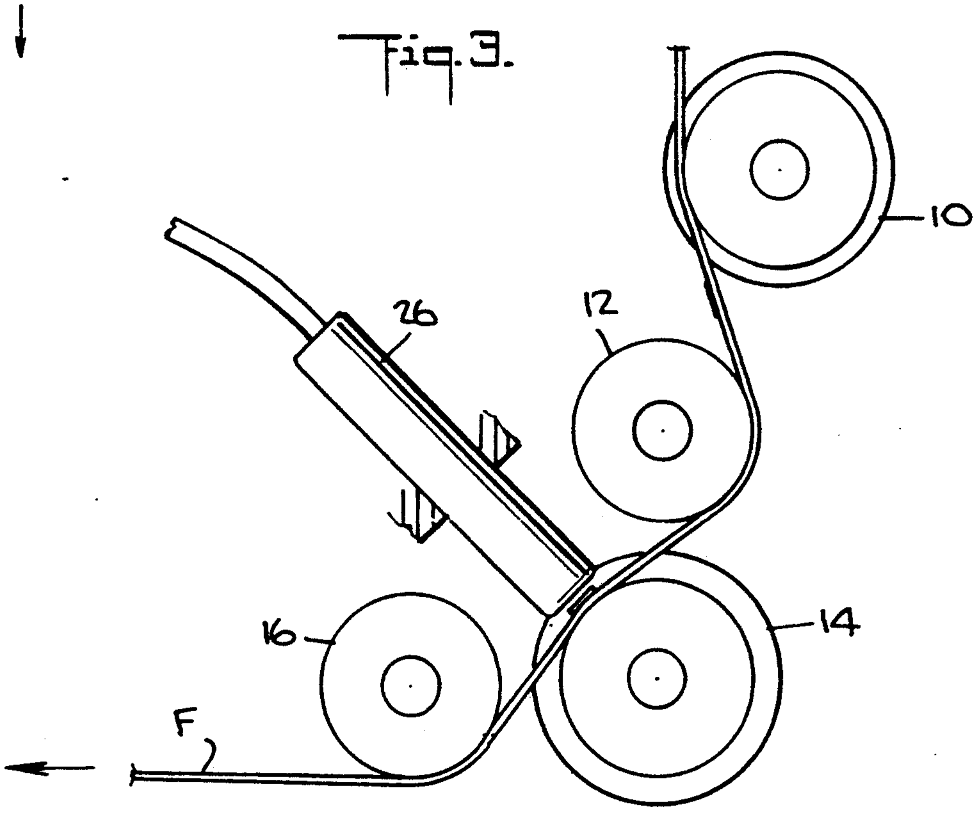
FIG. 3 shows the film path in more detail, and illustrates a cue applique on the film positioned opposite one of the proximity detectors.

An understanding of the digital cue system of the present invention, and the significant improvement which it represents over prior art cue systems, may be obtained with reference to FIGS. 1-9, which show the various mechanical and electrical components of the cue system. FIG. 1 is a perspective view of an assembly having a mounting bracket 100 for mounting the assembly onto a projector (not shown). The assembly incorporates the cue detector CD of the present invention and a failsafe device FD commonly used in the prior art to stop the projector when a film break occurs.

The cue detector CD has means for positioning a film F, which includes guide roller 10 and positioning rollers 12, 14 and 16. The cue detector CD further includes a row of proximity detectors positioned opposite the positioning roller 14 in a support assembly 20 along the transverse direction of the film F. For purposes of illustration, the support assembly 20 is shown as accommodating three proximity detectors, indicated by reference numerals 22, 24 and 26.

Upon leaving the cue detector assembly CD, the film travels under the failsafe device FD and over an exit roller 8 on its way to the take up reel or platter (not shown). Failsafe device FD is well known in the prior art. Briefly, it has two eccentrically mounted arms 15, 16, which pivot around an axle 27. Respectively attached to the long end of arms 15, 16 are failsafe rollers 17, 18, which ride along the edge of the film F. At the short end of each arm 15, 16 and positioned in parallel relationship to the pivot axle 17 are a pair of contact pins 19, 21. A microswitch 23, connected to circuitry which controls power to the film drive mechanism, is centrally positioned above failsafe arms 15, 16 so that its spring loaded contact 9 may be actuated by either of the two contact pins 19, 21. Should a break occur in the film F, at least one of the two arms 15, 16 will pivot in a downwardly direction, causing its corresponding contact pin 19 or 21 to actuate the microswitch 23, thereby stopping the film drive mechanism until a repair is made. In normal operation, after traversing the failsafe device FD, the film F moves around exit roller 8 and onto the take up reel or platter of the film delivery system.

Figure 6:
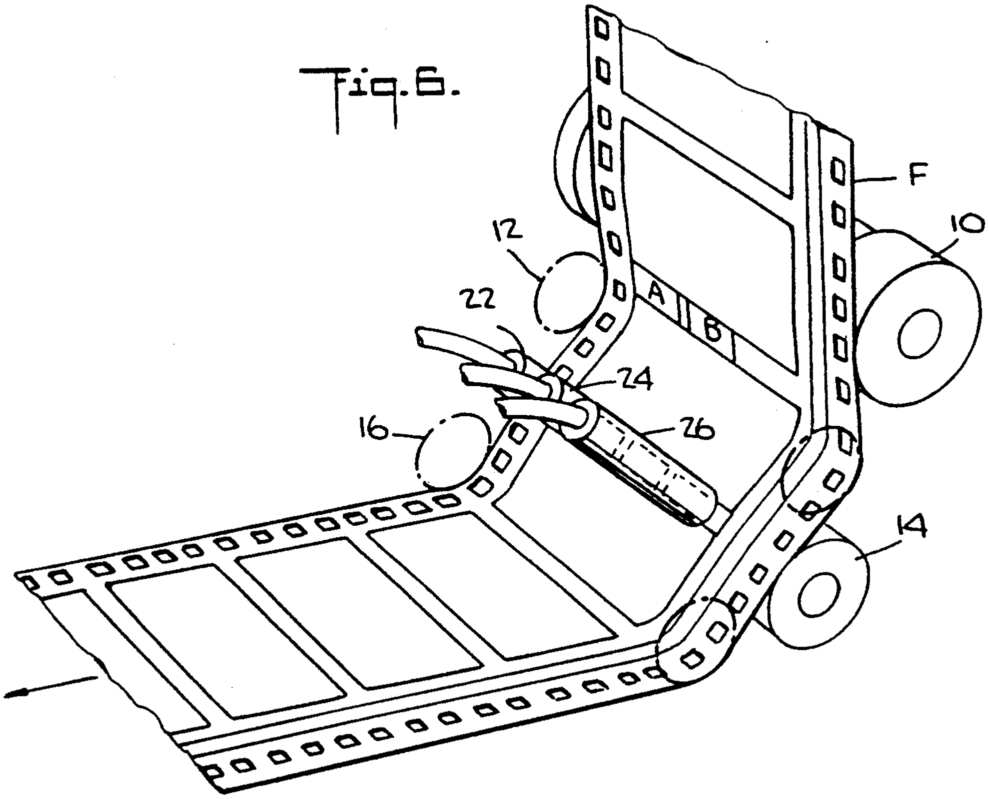
FIG. 6 shows a perspective view of the film strip in relationship to the three proximity detectors. The film strip has indicia in the form of cue appliques mounted thereon along the transverse interframe border of the film strip with each cue applique positioned so as to pass under a corresponding one of the proximity detectors.
Figure 7:
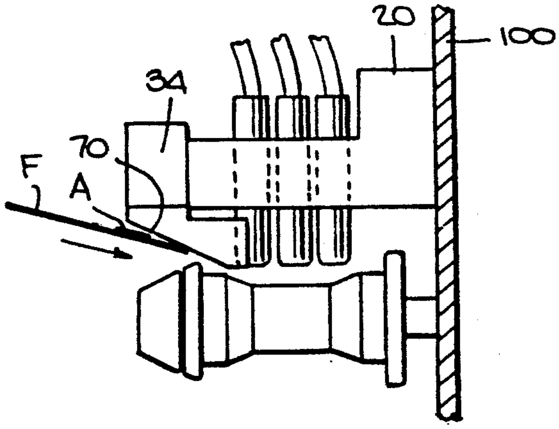
FIG. 7 is a view in a direction normal to the axes of the proximity detectors, showing a film strip being guided into position by means of a tapered guide member.
Figure 8:
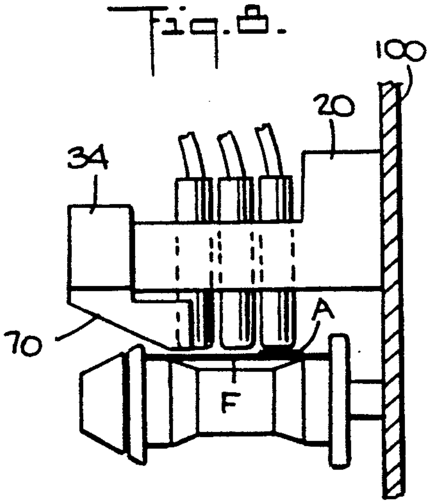
FIG. 8 is a view similar to FIG. 7, wherein the film strip is shown in the operative position with a cue applique mounted opposite the right most proximity detector.

The many novel features of the presently disclosed invention will now be presented and individually discussed in detail. As shown in FIGS. 5 and 6, the cue system disclosed herein utilizes cue appliques in the form of small conductive patches to form indicia which are adhesively positioned between successive picture frames along the interframe borders of the motion picture film F. In the preferred embodiment of the invention, the cue appliques may be cut from a 3/16" wide roll of adhesive backed aluminum foil (1.5 mils thick) and dimensioned so that three cue appliques 50, 52 and 54 may be attached at the indicated positions along an interframe border or frame line of the film F (see FIGS. 5 and 6), so as not to interfere with the picture or sound track portions of the film strip. It is recognized that by appropriately choosing the dimensions of the cue appliques, a fewer or greater number of appliques may be so positioned.

As utilized in the preferred embodiment of this invention, each cue applique represents a single digital bit of information of a multi bit digital code, the value of which depends upon the number of cue appliques and their relative positions along the interframe border of the film F. In the preferred embodiment, the presence or absence of individual appliques defines a three bit digital code which uniquely identifies a desired control function to be performed by the cue system when that three bit digital code is detected.

For example, the presence of the cue applique 50 at the position A closest to the mounting bracket 100 may represent a digital value 1 corresponding to the lowest order bit (with its absence correspondingly representing a digital value 0 for the lowest order bit). Similarly, the presence or absence of cue appliques 52 and 54 at positions B and C may respectively represent either a one or zero of the middle order and highest order bits of the digital code. As evident, three cue appliques are sufficient to represent $2^3-1$ (=7) unique digital codes. These digital codes are set forth in the following Table and may correspond to seven distinct control functions which are to be activated by the cue system (the digital code "000", i.e. the absence of any cue appliques, representing the absence of a control function).

TABLE

| Control Function | Applique Placement | Digital Code |
|---|---|---|
| F1 | Cue A only | 001 |
| F2 | Cue B only | 010 |
| F3 | Cues A and B | 011 |
| F4 | Cue C only | 100 |
| F5 | Cues C and A | 101 |
| F6 | Cues C and B | 110 |
| F7 | Cues A, B and C | 111 |

Detection of the digital code pattern represented by the one or more cue appliques 50, 52, 54 positioned along the interframe boundary of the film F is accomplished by the novel use of proximity detectors 22, 24, 26 mounted in support assembly 20 (see FIG. 2) and positioned so that the sensitive ends thereof (see FIG. 3) are proximate to, but spaced apart from, their corresponding cue appliques as the film F passes through the cue detector CD. Although three proximity detectors 22, 24, 26 are shown transversely mounted with respect to the film F in the illustrative embodiment of the invention, the cue system may be readily designed to utilize additional cue appliques and proximity detectors should more than seven control functions need to be accommodated. For example, the use of four cue appliques, in combination with four correspondingly positioned proximity detectors, would permit the digital cue system disclosed herein to provide for the representation and activation of $2^4-1$ or 15 unique control functions.

Proximity detectors utilized in the preferred embodiment of this invention are commercially available from Baumer Electric Ltd. The proximity detector is encased in a cylindrical housing and operates by monitoring changes in either capacitance or inductance between the sensing face of the proximity detector and a nearby target, i.e., the cue applique. The operating principles of these proximity detectors are well known and described in commercially available literature. For purposes of completeness, a brief description will be given herein of a proximity switch of the inductive type, which is used in the preferred embodiment of the invention.

Inductive proximity detectors are non-contact electronic switches which include within a sealed housing an oscillator, a Schmitt trigger, and an output amplifier. The oscillator generates a high frequency electromagnetic field which radiates from the sensing face of the proximity detector. When a metal target, such as a cue applique, enters this electromagnetic field, eddy currents are induced within the metal, causing a change in the amplitude of the oscillator signal and a corresponding voltage change at the output thereof. The Schmitt trigger is in one state when the metal target is proximate to the sensing face of the proximity detector, but switches as a result of the voltage change at the output of the oscillator to a second state when the metal target is moved outside of the proximity range of the proximity detector.

In the present application to a digital cue system, each proximity detector senses the presence or absence of its correspondingly positioned cue applique as the film is transported. For example, each of the proximity detectors 22, 24, 26 may normally be set to produce a high signal level. When the proximity detector senses the passage of an aluminum foil applique, a momentary low signal will be produced during the time that the aluminum foil applique is within the proximity range of the detector.

Proper spacing of the sensing face of the proximity detector in relation to the aluminum foil cue applique is important for reliable operation of the digital cue system. To easily adjust the spacing of each of the proximity detectors 2, 24, 26 with respect to the film F, the proximity detectors 2, 24, 26 are each slidably mounted within individual recesses of the support assembly 20 (see FIG. 4). Thus, proximity detector 24, shown removed from support assembly 20 in FIG. 4, may be slid into its corresponding recess in the support assembly 20 and adjusted so that the sensitive face thereof is spaced at the appropriate distance from the film F.

The design of the support assembly 20 permits fine positioning adjustments to be independently made to each of the proximity detectors 22, 24, 26. After the proximity detectors 22, 24, 26 are accurately positioned, they are rigidly clamped in support assembly 20. Coarse positioning of the proximity detectors may be performed before support assembly 20 is mounted to mounting bracket 100, with fine adjustment of the spacing between the proximity detectors 22, 24, 26 and the film F being made after the support assembly 20 is mounted to the mounting bracket 100. To complete the mechanical assembly, a tapered guide block 34 is mounted to the forward end of the support assembly 20. As shown most clearly in FIGS. 7 and 8, the guide block 34 has a tapered face 70 which guides the insertion of the film F between positioning rollers 12, 14 and 16, so that the film F is easily placed within the operative position shown in FIG. B.

Figure 9:
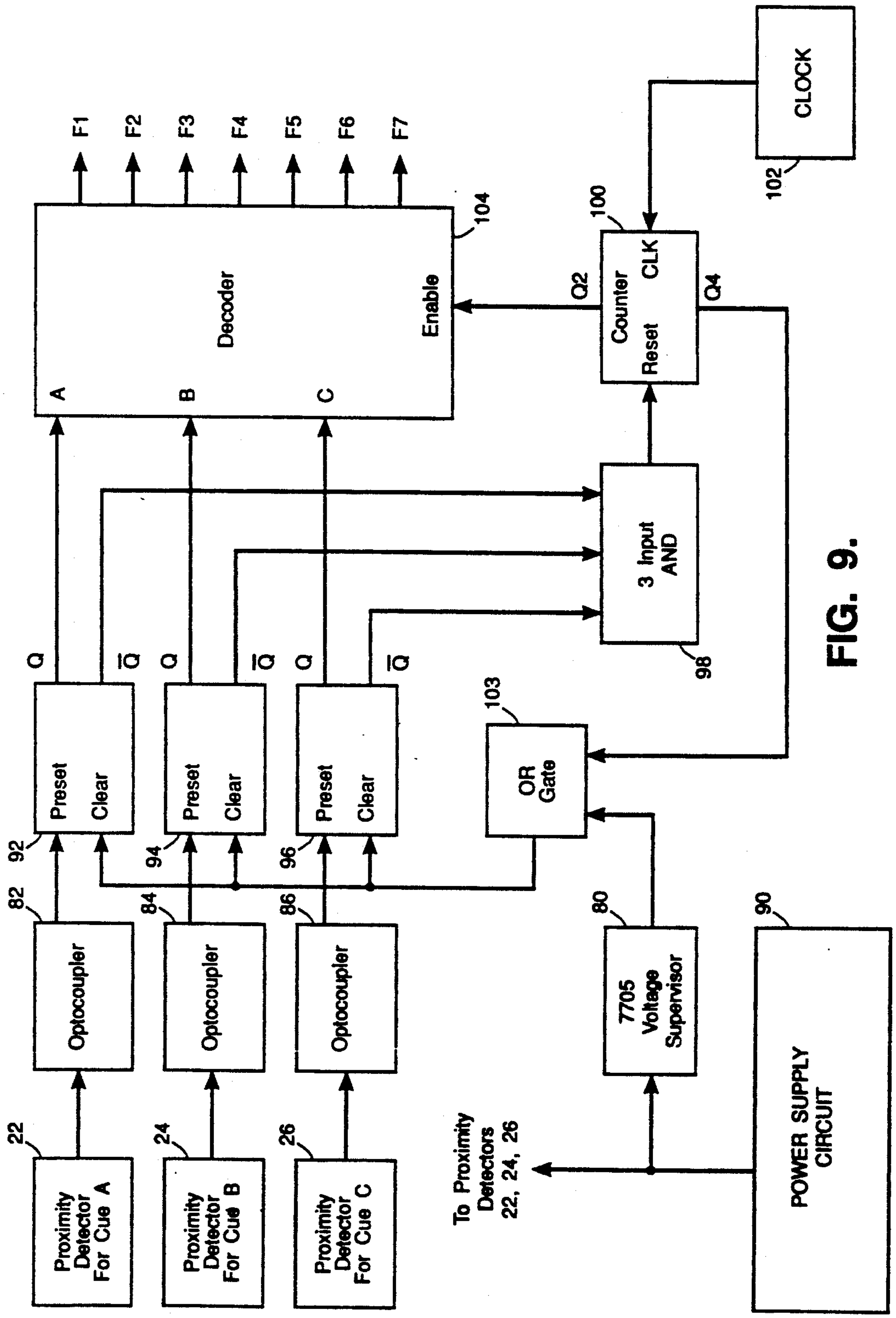
FIG. 9 is a circuit block diagram illustrating how the signals from the proximity detectors are processed to determine the digital code formed by the geometrical arrangement of cue appliques. The digital code is used to activate a control function corresponding to that code.

The proximity detectors 22, 24, 26 operate in conjunction with the control module shown in FIG. 9 to activate the various control functions in accordance with the unique digital code formed by the number and relative positions of the cue appliques detected thereby. As explained above, the preferred embodiment of the invention permits up to seven control functions to be activated.

FIG. 9 show the electronic circuitry of a control module used to process the signals generated by the proximity detectors 22, 24, 26. With reference to FIG. 9, the control module includes a power supply circuit 90 and circuitry for digitally processing the output of each of the proximity detectors 22, 24, 26 which respectively correspond to cue positions A, B and C (see FIG. 5). The power supply circuit 90 is a conventional regulated supply and provides DC power to the various components of the control module and to the proximity detectors 22, 24, 26. A supply voltage supervisor integrated circuit chip 80 (e.g., Texas Instruments No. TL7715) ensures proper application of power to the circuitry during power up of the control module and also acts to suppress transients. If the power supply circuit voltage drops at any time, the voltage supervisor 80 also provides for automatic reset of the digital logic within the control module.

The output of proximity detectors 22, 24, 26 are respectively connected to opto-couplers 82, 84 and 86, which serve the purpose of optically isolating the digital circuitry of the control module from AC noise and transients. In the preferred embodiment of the invention, Motorola No. 4N36 opto-couplers are used, which incorporate an infra-red emitting diode optically coupled to a monolithic silicon phototransistor. The outputs of opto-couplers 82, 84 and 86, track the outputs of proximity detectors 22, 24, 26 and are applied to the preset inputs of flip flops 92, 94, 96, respectively. In the preferred embodiment, each of these flip-flops is one-half of a Model No. 7474 dual flip flop, manufactured by National Semiconductor. The three Q outputs of flip-flops 92, 94 and 96 are connected respectively to the A, B and C of a decoder 104 and, in the absence of a signal from their respective proximity detectors to indicate the passage of a cue applique, provide normally low signals at the inputs to the decoder 104. The complimentary Q outputs of flip flops 92, 94, 96, which normally generate a high signal, are connected to a three input AND gate 98. The normally high signal at the output of the AND gate 98 is connected to the reset pin Q4 of a decade counter 100 and holds the counter 100 in the reset state until passage of one or more cue appliques is detected by the proximity detectors 22, 24, 26.

In operation, when power is first applied, all flip-flops 92, 94 and 96 are reset by the output of the voltage supervisor 80, applied through OR gate 103 to the reset inputs of each flip flop 92, 94 and 96. In addition, decade counter 100 is also held in its reset state by the high signal from AND gate 98. When passage of a cue applique is detected by one of the proximity detectors 22, 24 and 26, its output goes low, and the output of the corresponding opto-coupler 82, 84 and 86 also produces a low signal. This causes the Q output of the associated flip-flop to go high and the $\overline{Q}$ output to go low.

Decade counter 100, previously held in the reset position by the output of AND gate 98, now activates and is driven by 250 millisecond clock pulses from clock generator 102. Clock generator 102 may be a National Semiconductor Model No. LM555 timer chip. At the second clock pulse from clock generator 102, the Q2 output of counter 100 is activated, thereby enabling decoder 104 to read and decode the signals present on its A, B and C inputs. The third pulse from clock generator 102 to decade counter 100 disables the decoder 104 and the fourth pulse output from decode counter 100 in response to clock generator 102 is applied to OR gate 103 to provide a high signal which clears the inputs of each of flip flops 92, 94, 96, thereby resetting their respective Q inputs to the normally low state and their $\overline{Q}$ inputs to the normally high state. When this occurs, the AND gate 98 again provides a high output signal, which holds the decade counter 100 in its reset state until the next series of one or more cue appliques is detected.

Decoder 104 provides an output along one of lines F1–F7 in accordance with the logic levels present at its inputs A, B and C, as shown in the above Table. Thus, if all three cues are sensed, inputs A, B and C to the decoder 104 will all be high, generating a signal along line F7. This signal controls a conventional relay closure (not shown) to activate the control function associated with line F7. Thus, depending upon the digital configuration defined by the number and placement of the cue appliques, one of the lines F1–F7 will be activated to initiate a control function associated with that line.

In summary, the novel cue system disclosed herein utilizes aluminum foil appliques which are adhesively attached at predetermined locations along the length of a motion picture film, at which locations a control function is to be performed during playback. The appliques are geometrically arranged to define a digital code, thereby permitting a large number of control functions to be implemented with only a small number of individual appliques. In the preferred embodiment, the appliques are transversely positioned with respect to the film along the interframe boundary which separates successive picture frames. As shown in the preferred embodiment of the invention, three appliques define a code which can accommodate seven control functions ($2^3-1$), whereas four appliques permit fifteen control functions ($2^4-1$), and so on As the motion picture film is transported through the projector, passage of the appliques is detected by a row of proximity detectors positioned proximate to the plane of the film, so as to detect the presence of each applique and provide a corresponding output. The cue system includes a control module which accepts the outputs of each of the proximity detectors and uses digital logic to decode the digital cue signals and provide outputs along individual lines for activating different control functions. Obvious extensions of the circuitry disclosed for the control module may be implemented in the case of four or more proximity detectors, to provide for fifteen or more control functions, as the case may be.

Since a non-contacting type of detection is utilized, the disclosed cue system is not sensitive to poor contact conditions or to the accumulation of debris, as is the case in the prior art. Further, although the disclosed cue detection system represents a significant advance in the manner in which cue detection is performed, the cue detector is configured to be easily retrofitted onto existing projectors in a simple and straightforward manner.

Although the invention has been described above with reference to particular preferred embodiments, it is to be understood that these embodiments are merely illustrative of the desirable aspects and features of the invention. As such, it may be obvious to a person skilled in the art to make numerous modifications to the illustrative embodiments which have not been described herein. However, such modifications and other arrangements which may be devised to implement the invention should not be deemed as departing from the spirit and scope of the invention as described herein and set forth in the following claims.

What is claimed is:

1. A system for activating one or more control functions during the presentation of a motion picture film comprising:
- a) indicia provided along said motion picture film, each of said indicia defining a digital code pattern in accordance with the positioning of said indicia relative to said motion picture film;
- b) one or more non-contacting proximity detectors capable of generating signals representative of said digital code patterns when said indicia pass proximate thereto; and
- c) circuit means for processing said signals to determine the digital code corresponding to each of said digital code patterns and activating a control function associated therewith.

2. A system for activating one or more control functions during the presentation of a motion picture film comprising:
- a) indicia provided along said motion picture film, each of said indicia including one or more cue appliques which form a digital code pattern defined by the positioning of said cue appliques relative to each other and to said motion picture film;
- b) means for detecting the passage of said indicia during playback of said motion picture film and generating signals representative of said digital code patterns; and
- c) circuit means for processing said signals to determine the digital code corresponding to each of said digital code patterns and activating a control function associated therewith.

3. The system of claim 2 wherein said digital code patterns are each uniquely determined by the number and relative positioning of said one or more cue appliques with respect to said motion picture film.

4. The system of claim 2 wherein each of said digital code patterns is formed by the relative positioning of said one or more cue appliques along an interframe border of said motion picture film.

5. The system of claim 4 wherein each of said cue appliques is a patch of adhesive backed metallic foil.

6. The system of claim 1 wherein said circuit means includes a decoder for generating signals to activate each of said control functions.

7. A system for activating one or more control functions during the presentation of a motion picture film comprising:
- a) one or more cue appliques attachable at a predetermined position along said motion picture to define a digital code pattern;
- b) one or more non-contacting proximity detectors correspondingly positioned with respect to said motion picture film to detect the proximate passage of said cue appliques and generate signals indicative of said pattern; and
- c) circuit means for processing said signals to determine said digital code corresponding to said pattern and activating a control function associated therewith.

8. The system of claim 7 wherein said digital code pattern is formed by the relative positioning of said one or more cue appliques along an interframe border of said motion picture film.

9. A cue detector for detecting the passage of indicia provided along a motion picture film, each of said indicia forming a digital code pattern comprising:
- a) one or more non contacting proximity detectors; and
- b) means for positioning said motion picture film with respect to said one or more non contacting proximity detectors so that said non contacting proximity detectors generate signals indicative of said digital code pattern when said indicia pass proximate thereto.

10. The cue detector of claim 9, wherein each of said indicia comprises one or more cue appliques attached to said motion picture film.

11. The cue detector of claim 9 which further comprises circuit means for processing said signals to activate control functions associated therewith.

12. Indicia for a motion picture film, attachable at a predetermined positions thereof for cueing a plurality of control functions, each of said indicia comprising one or more cue appliques arranged to form a digital code pattern defined by the placement of said one or more cue appliques relative to each other and to said motion picture film.

13. The indicia of claim 12 wherein said digital code pattern is defined by the number and relative positioning of said cue appliques.

14. The indicia of claim 12 wherein said cue appliques are dimensioned to form said digital code pattern along an interframe border of said motion picture film.

15. A method for activating any one of a plurality of control functions during the presentation of a motion picture film comprising the steps of:
- a) providing indicia on said motion picture film, each of said indicia including one or more cue appliques which form a digital code pattern defined by the positioning of said cue appliques relative to each other and to said motion picture film;
- b) detecting the passage of said indicia during playback of said motion picture and generating signals representative of each of said digital code patterns; and
- c) processing said signals to activate control functions associated with said digital code patterns.

16. The method of claim 15 wherein each of said digital code pattern is formed by placing one or more cue appliques along an interframe border of said motion picture film.

17. The method of claim 15 wherein detection of said indicia during playback of said motion picture film is performed with one or more non-contracting proximity detectors.

* * * * *